United States Patent [19]
Detriche

[11] Patent Number: 5,241,249
[45] Date of Patent: Aug. 31, 1993

[54] PROCESS FOR CONTROLLING A ROBOT ARM BY DEFINING SUBSTITUTION PATHS

[75] Inventor: Jean-Marie Detriche, Noisy le Roi, France

[73] Assignee: Commissariat a l'Energie Atomique, France

[21] Appl. No.: 817,770

[22] Filed: Jan. 8, 1992

[30] Foreign Application Priority Data

Jan. 9, 1991 [FR] France ............... 91 00193

[51] Int. Cl.⁵ ............... B25J 9/16; B25J 9/02
[52] U.S. Cl. ............... 318/508.11; 318/508.22; 318/594; 901/8; 901/20; 364/183
[58] Field of Search ............... 318/560-632; 395/80-99; 901/3, 5, 9, 8, 12, 13, 15-23; 364/170, 183

[56] References Cited

U.S. PATENT DOCUMENTS

| | | | |
|---|---|---|---|
| 4,488,242 | 12/1984 | Tabata et al. | 318/594 X |
| 4,594,670 | 6/1986 | Itoh | 318/568 |
| 4,967,126 | 10/1990 | Gretz et al. | |
| 4,980,839 | 12/1990 | Souji et al. | 318/568.22 X |
| 5,021,970 | 6/1991 | Mohri et al. | 901/8 X |
| 5,062,755 | 11/1991 | Lawrence et al. | 901/20 X |

FOREIGN PATENT DOCUMENTS 0108549  5/1984  European Pat. Off. .
2229296  9/1990  United Kingdom .

Primary Examiner—Paul Ip
Attorney, Agent, or Firm—Pearne, Gordon, McCoy & Granger

[57] ABSTRACT

A process for controlling a robot arm having a certain number of articulations or joints (A to F), which can abut. Substitution paths are automatically defined by calculation or by the choice of intermediate objectives in order to arrive at destination points, when the direct path would involve the abutment of certain joints.

10 Claims, 3 Drawing Sheets

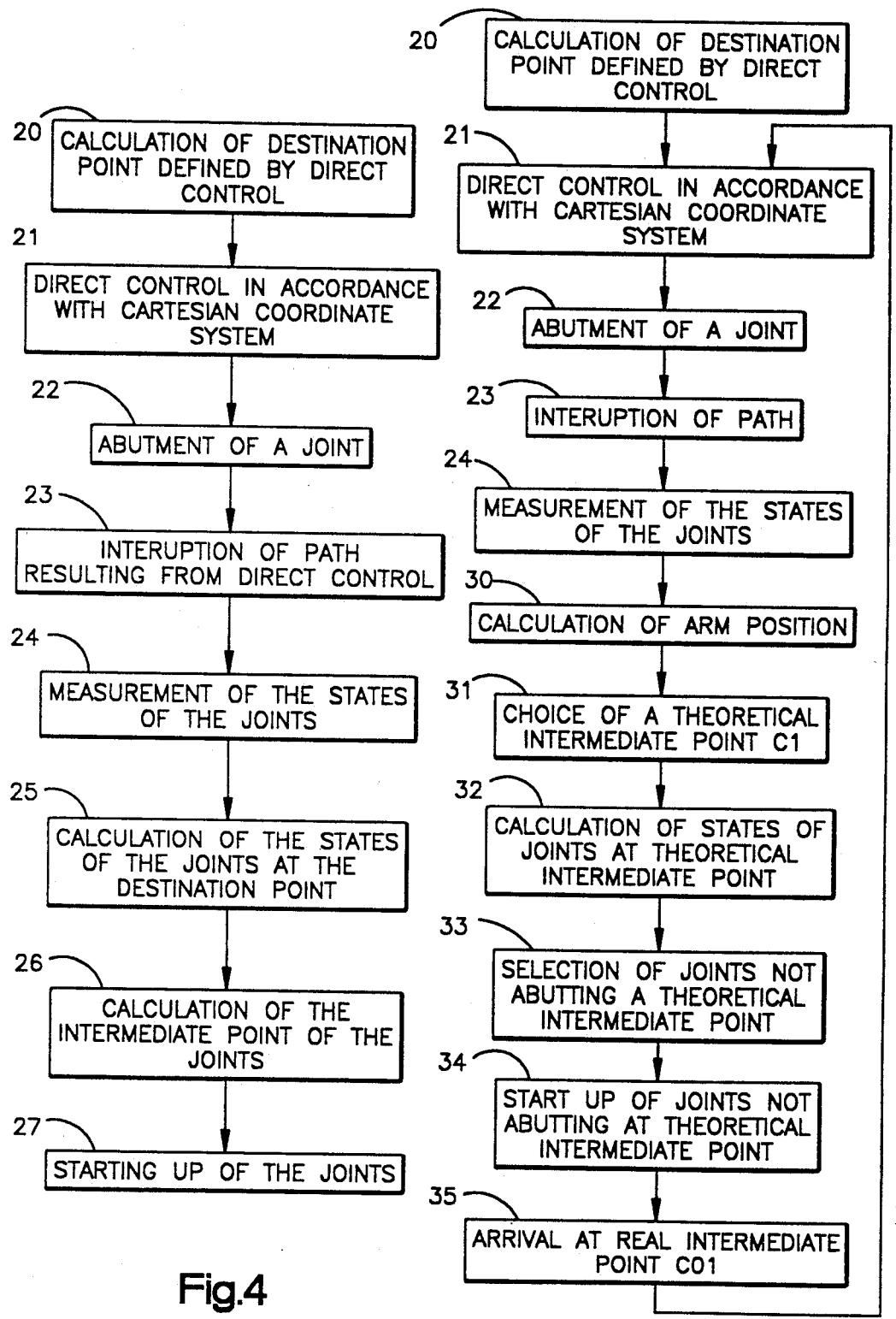

PROCESS FOR CONTROLLING A ROBOT ARM BY DEFINING SUBSTITUTION PATHS

BACKGROUND OF THE INVENTION

Field of the Invention

The invention relates to a process for controlling a robot arm by defining substitution paths.

Description of the Related Art

Various means exist for controlling the displacements of a robot arm formed from sections interconnected by articulations or joints towards an objective to be reached. The displacement instructions can be given by voice, by pressing a button or by tilting a lever. According to another classification type, the control displacement can be incremental, i.e. an instruction controls an invariable elementary displacement of a predetermined nature, which is repeated for the number of times necessary in order to reach the objective, or can be proportional to a time, i.e. its amplitude is dependent on the time during which the control member is switched to a given state. Finally, another applicable solution, if use is made of a lever, consists of making the displacement proportional to that of the lever. The displacement is then controlled in position or speed, i.e. the arm assumes a position or speed dependent on the lever displacement.

According to a completely different concept, it is also possible to envisage the definition of the objective to be reached not by a displacement from an initial position, but from a destination point defined by introducing its coordinates into a fixed coordinate system using a keyboard and programming language, or after having stored the position reached by the robot during a preliminary learning stage.

In all cases, the trajectory is defined by Cartesian coordinates which the robot control system must convert into rotation information with respect to the articulations or joints connecting the different arm sections, or more generally movements of said joints. The term joints is here understood to cover all types of mechanisms able to join robot arm sections and in particular slides, as well as pivots or hinges allowing such rotations. This calculation escapes the direct control by the operator. As in practice the articulation can only be placed in states belonging to operating ranges limited by stop or abutment states, the situation frequently arises that the direct path, between the robot starting position and that corresponding to the objective to be reached, cannot be effectively covered because certain articulations would abut. In the hitherto known systems, no means exists for obviating this difficulty and the arm is stopped. Therefore the operator must define a substitution path making it possible to release the arm by moving away from the abutment states, which is irksome and not necessarily easy when the arms are of a complex nature. However, for a learning-based robot, British Patent 2 229 296 discloses a process in which parts of the trajectory learned, where the articulations abut, are not stored, so that the trajectory covered subsequently does not include these parts. However, unlike in the invention, in the '296 process there is no substitution path automatically created whilst covering the present trajectory.

EP-A-108 549 describes a robot arm, whose joints are subject to preprogrammed rotations, when lateral obstacles are encountered, but which can lead to considerable displacements on the end of the arm, which are dangerous or inconvenient in congested environments.

SUMMARY OF THE INVENTION

The invention has sought to free the user from such worries. Substitution paths or degraded paths, which the robot arm follows as soon as there is an abutment of one of the joints preventing it from following the direct path, are automatically created.

According to a first construction, the substitution path is defined by varying the states of the joints on the basis of states corresponding to the abutment of the joints and up to precalculated states corresponding to a position where the arm has reached the objective.

Another solution consists of defining the substitution path by calculating theoretical intermediate points between the positions reached by the arm and the object to be reached, then the theoretical intermediate states of the joints, whose theoretical intermediate points, after which the articulations are brought into an abutment state for the joints, whose theoretical intermediate state is inaccessible and to the theoretical intermediate state for the other joints, thus making the arm reach a real intermediate point. This procedure is repeated until the objective is reached.

The process can be refined on introducing a criterion according to which the substitution path is interrupted when certain joints in isolation or simultaneously abut. This is a safety criterion which prevents movements too remote from the desired movement under conditions where they would neither be provided, nor checked.

A robot arm to which the invention has been applied has three sections articulated in rotation in a horizontal plane and jointly mobile in vertical translation, a fourth section articulated in rotation in a plane vertical to one of the three preceding sections and a member articulated to the fourth section in rotation according to a pivoting movement.

BRIEF DESCRIPTION OF THE DRAWINGS

The invention is described in greater detail hereinafter relative to non-limitative embodiments and the attached drawings, wherein:

FIGS. 4 and 5 are flow charts defining the process according to the invention.

DESCRIPTION OF THE PREFERRED EMBODIMENTS

Figure 1:
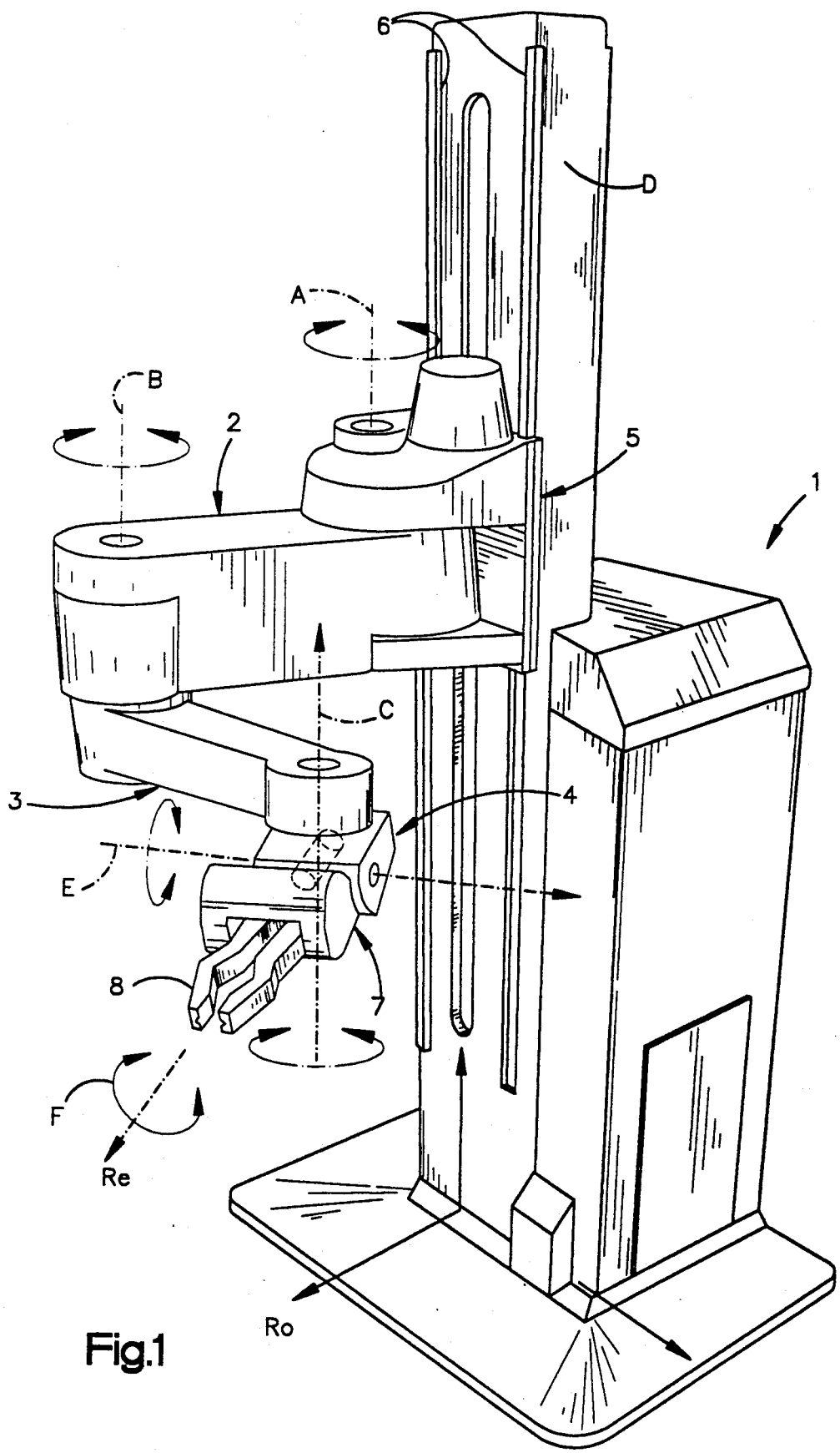
FIG. 1 is a view of a robot arm which has already been briefly described.

The robot arm according to the invention comprises a fixed frame 1 and three chain-connected sections 2,3,4. A first section 2 rotates in a horizontal plane, articulated to one end of a slider 5 in accordance with a first, articulation or joint A having a vertical axis. The section 3 is connected to the other end of the section 2 by a second articulation or joint B having a vertical axis. In the same way the third section 4 is articulated to the other end of the second section 3 by a third articulation or joint C having a vertical axis. The slider 5 moves on vertical rails 6 on the frame 1 in accordance with a degree of vertical translation freedom, which is referred to as the fourth articulation or joint D for ease of reference.

The third section 4 carries a wrist, which is articulated thereto according to a fifth articulation or joint having a horizontal axes. Finally, a gripping device 8 able to seize objects is placed on the wrist 7 and can pivot about a sixth articulation or joint F having an axis perpendicular to the joint E. $R_o$ and $R_e$ symbolize Cartesian coordinate systems respectively linked to a point fixed to the bottom of the frame 1 and to the end of the arm, e.g. to the wrist 7. These coordinate systems are used for defining the robot arm displacements. The translation displacements of the wrist 7 can in particular be controlled by position or translation indications of the destination point expressed by Cartesian coordinates in the system $R_o$.

Figure 2:
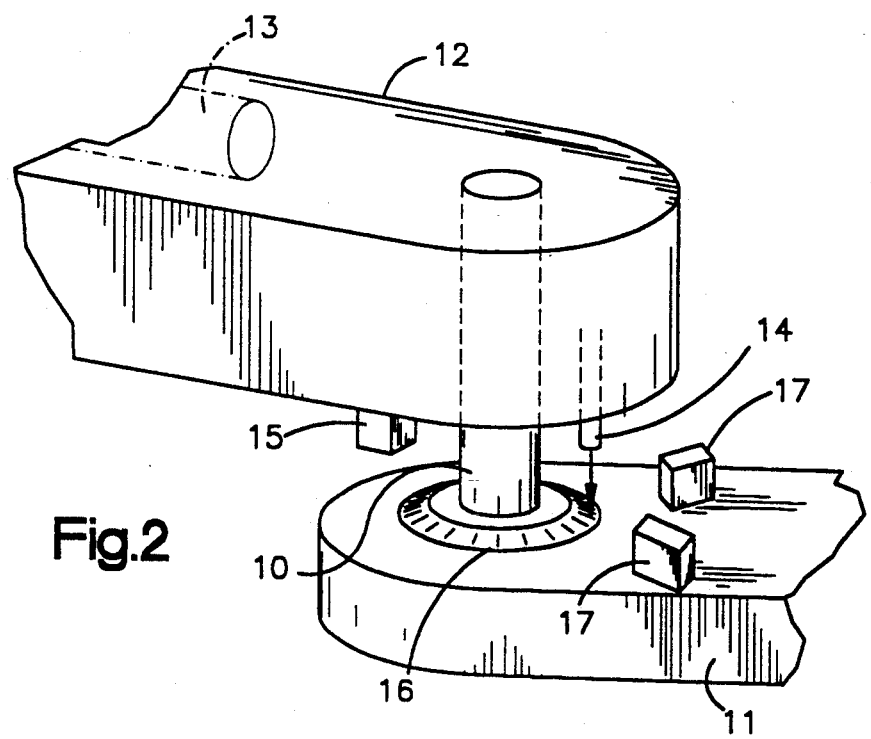
FIG. 2 is a joint between two robot arm sections.

The construction of each rotary joint is diagrammatically shown in FIG. 2. There is firstly an articulation or swivel shaft 10 which interconnects two sections 11, 12. The shaft 10 is rigidly connected to one of the sections 11 and the other section 12 carries a motor 13 making it rotate about the shaft 10, together with a counter 14 and an abutment 15. The counter 14 reads graduations 16 arranged in circular form about the shaft 10 on a planar surface of the section 11 and the abutment 15 can touch contacts of two switches 17 also located on the section 11. With the abutment 15 the switches 17 define abutting states limiting an operating travel of admissible states of the joint. Each of these states can be referenced with the aid of the encoder constituted by the counter 14 and the graduations 16. Obviously the invention can be used with other encoders and with other abutment types, which are standard equivalents in this technology. The motor 13 and the counter 14 are connected, as well as the switches 17, to a robot control system (not shown).

Preference may be given to the use of non-physical abutments defined by robot control software and which are placed in front of the material abutments defined hereinbefore.

The translation movement joints can be constructed with the same, but adapted means.

Figure 3:
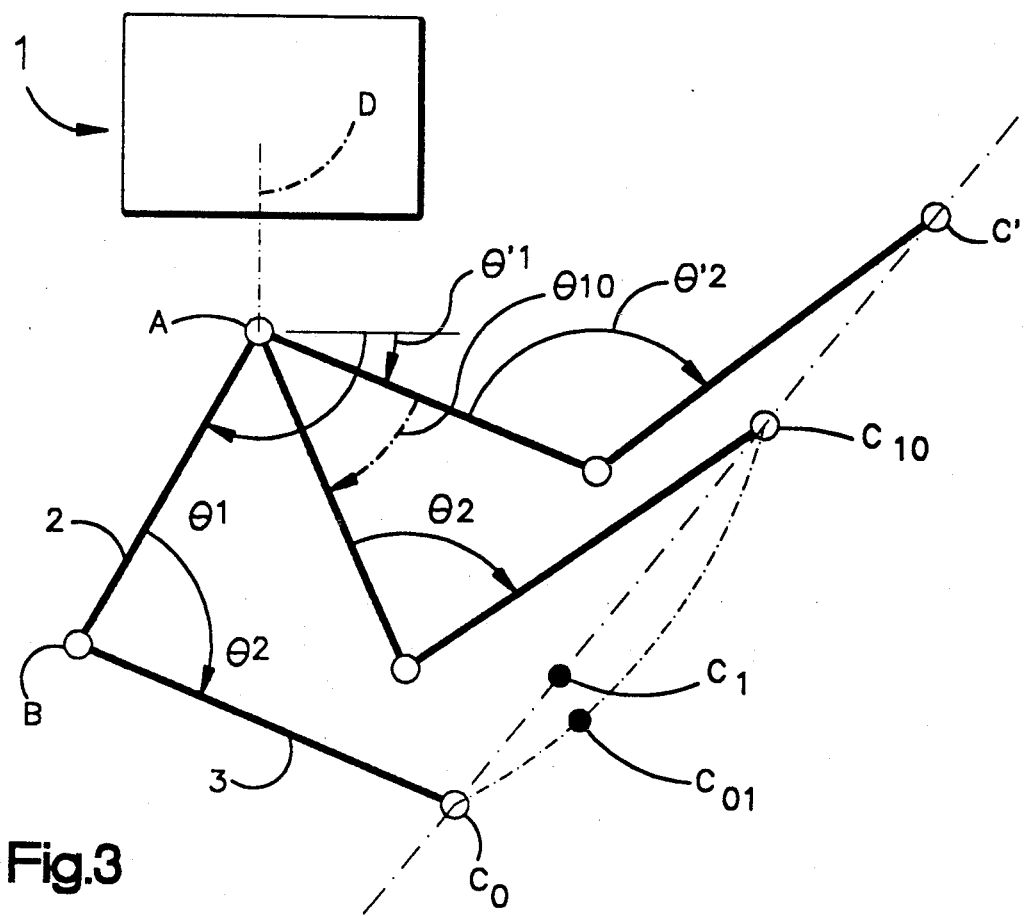
FIG. 3 is a direct path and a substitution path.

Substitution paths are obligatory in certain situations due to the presence of abutments. Reference is now made to the configuration of FIG. 3, where it is desired to bring about a displacement of the sections 2 and 3 defining a path of the third joint C. The arm has to move so that the third joint C reaches a destination point C' from a state $C_o$, where the first section 2 forms an angle $\theta 1$ with the frame 1 and angle $\theta 2$ with the second section 3. The path to the point C' would normally be direct, i.e. in straight line form, in order to optimize the arm movements. This would make it necessary to reduce the angle $\theta 2$, but FIG. 3 shows that the arm has a state where the second joint B is in abutment, because the angle $\theta 2$ cannot be less than 90°. It is therefore impossible to reduce it and it is necessary to define a substitution path and FIG. 4 gives a process for obtaining this.

When the direct control of arm is possible, instructions are given for displacing the end of the arm in accordance with the main directions of a Cartesian coordinate system such as Ro or Re, i.e. towards the front, towards the rear, towards the sides or in vertical direction, whilst rotating it to the desired angular position. The direct control instructions make it possible to deduce a destination point C', either directly, or via a displacement (stage 20) and are automatically converted by the transformations of coordinates into control movements (stage 21) of the joints until one of them possibly abuts (stage 22). The path is then interrupted and the states of the joints of the arm at this instant are measured (stages 23 and 24) or evaluated by calculation. The destination point C' can either be the destination point defined by the control of the arm, or an intermediate point between said destination point and the starting point. Intermediate points are automatically calculated in most robot arm control systems in order to ensure that the trajectory is followed with an adequate precision. The control system ensures that the joints reach the values of the articulation coordinates calculated for these intermediate points. Corrections for straightening the trajectory are performed if deviations appear. The choice of the intermediate points and their number result from criteria particular to each control system, the most simple consisting of placing the points at regular, fixed intervals.

In stage 25, it is then possible to calculate the angular states of the first and second joints A and B at the destination point C'. These states are defined by the angle $\theta'1$ and $\theta'2$ of FIG. 3. Several solutions are sometimes possible, because it may occur that the arm can assume several configurations at the destination point C'. In this case, preference is normally given to the position involving no extension of two successive sections 2 and 3, in order not to overextend the arm.

The joints are then put into operation successively or simultaneously with stage 27 so that the states $\theta 1$ and $\theta 2$ of the joints A and B converge towards the calculated states $\theta'1$ and $\theta'2$. A substitution path is then covered, which leads to the destination point C'. It is not known through said Cartesian coordinates, but there is a stage 26 preceding starting up for calculating intermediate points of the substitution path, or intermediate objectives defined solely by the angular states of the joints at these objectives. The interest of this operation is to be able to synchronize the movements of the joints in order that they together arrive in their state corresponding to the destination point C'. The displacements of the joints are monotonic, always performed in the same direction, and can be carried out at a constant speed as a function of time.

Another way to create substitution paths is summarized by the flow chart of FIG. 5. Once again there are stages 20 to 24 but, when the states of the joints are evaluated, a calculation of the position of the arm in Cartesian coordinates of the third joint C is performed in stage 30. The substitution path is defined by an iterative process and consists of gradually moving the third joint C towards the destination point C'. For this purpose (FIG. 3), on the segment $C_oC'$ is defined an intermediate point C1 at a given distance from the actual position $C_o$ of the third joint C (stage 31). The states $\theta 11$ and $\theta 21$ of the joints A and B at this intermediate point C1 are then calculated in stage 32. These are in fact theoretical states which would have to be assumed by the joints to effectively arrive at this point. Certain of these states can be beyond the abutment states, which would make it necessary to carry out a selection (stage 33) of the joints (in this case A, because $\theta 11$ is not an abutment state), which would not be in abutment at the intermediate point C1. These joints are then started up (stage 34) to arrive at the states calculated in stage 32. There is no movement of the joints which would abut (in this case B, because $\theta 2$ cannot decrease and 21 is smaller than the latter). This manner of proceeding brings the arm (stage 35) to a point C01 located on a substitution path resulting from the articulation states effectively reached $\theta 11$ and $\theta 2$ and remote from the previously calculated point C1.

The Cartesian coordinates of this real intermediate point C01 are then calculated and then there is a return to stage 021 in order to recommence the process and move in successive stages towards the destination point C1 until it is effectively reached by choosing a new theoretical intermediate point on the segment joining points C01 and C'. The joints which are liable to abut on covering the substitution path can vary during this path without the operator being informed thereof and without having to take special measures. FIG. 3 shows the point C10 at which the second joint B stops being in abutment and where the angle which it forms starts to increase from the value $\theta 2$ to the final value $\theta'2$. This embodiment, which imposes supplementary calculations and in particular more numerous convergences between the Cartesian coordinates and the articulation coordinates, permits a very rapid convergence in general and can therefore be considered favourably if it is possible to use the robot arm in congested environments.

The process can be improved if a supplementary criterion is introduced in order to make the entire substitution path impossible in the case where an excessive number of joints, or certain joints having a crucial affect on the working of the robot would abut. In the case of the robot of FIG. 1, the situation is that any movement would be interrupted if four of the joints together abutted, or if the fifth and sixth joints E and F abutted together. The latter criterion is justified in the case of a robot terminated by a gripping device 8 for gripping conventional objects, such as liquid-filled glasses, which must not be excessively inclined. Other criteria can obviously be defined for other robot arms or different applications.

I claim:

1. A process for controlling a robot arm in moving a wrist at an end of the arm to an objective, the arm comprising rigid sections connected by joints, the sections taking relative positions at the joints which correspond to joint states, the joint states having allowed ranges limited to abutment states, comprising the automatic steps of:
   defining a direct path from a current wrist position to the objective;
   computing sets of theoretical joint states for the robot arm to carry the wrist along the direct path when the joints together take the joint states of each set successively;
   updating all sets that comprise at least one theoretical joint state outside the allowed range of joint states to create updated sets in which all the joint states are within the allowed ranges;
   discarding the sets that comprise at least one theoretical joint state outside the allowed range of joint states; and
   moving the wrist along a substitution path by bringing the joints through the computed sets of theoretical joint states that comprise no joint state outside the allowed range of joint states and the updated sets.

2. A process according to claim 1, wherein the updated sets are created by replacing the theoretical joint states outside the allowed ranges with joint states within the allowed ranges.

3. A process according to claim 1, wherein the joint states within the allowed ranges are abutment states.

4. A process according to claim 1, wherein the substitution path is interrupted when at least one of the joints reaches a theoretical joint state outside the allowed range of joint states.

5. A process according to claim 1, wherein the substitution path is interrupted when a selected number of the joints reach a theoretical joint state outside the allowed range.

6. A process for controlling a robot arm in moving a wrist at an end of the arm to an objective, the arm comprising rigid sections connected by joints, the sections taking relative positions at the joints which correspond to joint states, the joint states having allowed ranges limited by abutment states, comprising the automatic steps of:
   defining a direct path from a current wrist position to the objective;
   computing sets of theoretical joint states for the robot arm to carry the wrist along the direct path when the joints together take the joint states of each set successively;
   discarding the sets that comprise at least one theoretical joint state outside its allowed range; and
   moving the wrist along a substitution path by bringing the joints through the computed sets of theoretical joint states that comprise no joint state outside the allowed range of joint states.

7. A process according to claim 6, wherein all the sets of theoretical joint states that the joints should take after at least one of the sets that comprise at least one theoretical joint state outside an allowed range are discarded.

8. A process according to claim 6, wherein the substitution path is interrupted when at least one of the joints reaches a theoretical joint state outside the allowed range of joint states.

9. A process according to claim 6, wherein the substitution path is interrupted when a selected number of the joints reach theoretical a joint state outside the allowed range.

10. A robot arm control process according to claim 6, characterized in that the arm has three sections (2,3,4) articulated for rotation in a horizontal plane and jointly mobile in vertical translation, a fourth section (7) articulated for rotation a plane vertical to one of the three preceding sections and a member (8) articulated to the fourth section for rotation in accordance with a pivoting movement.

* * * * *

UNITED STATES PATENT AND TRADEMARK OFFICE
CERTIFICATE OF CORRECTION

PATENT NO. : 5,241,249

DATED : August 31, 1993

INVENTOR(S) : Jean-Marie Detriche

It is certified that error appears in the above-identified patent and that said Letters Patent is hereby corrected as shown below:

Column 1, line 16, delete "classification"; and line 62, after "the" insert --present--.

Column 2, line 19, delete ", whose" and insert --at the--; and line 68, after "joint" insert --E--.

Column 3, line 46, after "and" insert --an--;

line 56, delete "the"; and line 56, after "of" insert --the--.

Column 4, line 63, delete "21" and insert --θ21--; and line 64, delete "latter" and insert --θ2--.

UNITED STATES PATENT AND TRADEMARK OFFICE
CERTIFICATE OF CORRECTION

PATENT NO. : 5,241,249

DATED : August 31, 1993

INVENTOR(S) : Jean-Marie Detriche

It is certified that error appears in the above-identified patent and that said Letters Patent is hereby corrected as shown below:

Column 5, line 3, delete "021" and insert --21--;

line 19, delete "possible" and insert --necessary--; and line 24, delete "affect" and insert --effect--.

Signed and Sealed this

Tenth Day of May, 1994

Attest:

Attesting Officer

BRUCE LEHMAN

Commissioner of Patents and Trademarks